INVENTOR.
CLIFFORD H. SNYDER, JR.
BY
HIS ATTORNEY

United States Patent Office 3,346,276
Patented Oct. 10, 1967

3,346,276
SEALING ARRANGEMENT FOR FLUID TIGHT
COUPLING
Clifford H. Snyder, Jr., 173 Rosemont Drive,
Coraopolis, Pa. 15108
Filed July 2, 1965, Ser. No. 469,252
8 Claims. (Cl. 285—110)

ABSTRACT OF THE DISCLOSURE

A sealing arrangement for fluid couplings of the type wherein a nipple is axially retained within a housing by balls captive in the housing which are reciprocable radially into a retaining groove formed in the nipple. The sealing arrangement consists of a seal ring disposed between the end of the nipple and the housing and two O-rings, one of which is retained by the housing and seals against the exterior of the nipple and the other of which is retained by the nipple and seals against the interior of the housing. The construction of the coupling permits swiveling of the nipple relative to the housing and the seal arrangement prevents leaking of fluid from large couplings even at temperature extremes from −300° F. to +400° F. The seals are preferably formed of Teflon.

---

The present invention relates to a sealing arrangements for a fluid tight coupling, and more particularly to a sealing arrangement which will provide a high pressure fluid seal formed from relatively nonresilient sealing material for a coupling and particularly for a relatively large coupling that is subject to wide variations in pressure and temperature.

In the modern use of fluid couplings, the fluids passing through the conduits coupled by the coupling are likely to be at extremely high pressures and at varying temperatures. Further, the fluids may be corrosive or destructive when exposed to conventional sealing materials such as rubber, or the like. In addition, the couplings may be subject to extremely low pressures, and even negative pressures during the course of operation.

The present invention is directed to a sealing arrangement for large couplings that connect conduits having a diameter of two to three inches or greater. While particularly adapted to sealing large couplings, the sealing arrangement of the present invention is also applicable to smaller couplings which have exposure to extremely high and low pressures and extremely high and low temperatures.

In working with couplings for large diameter conduits, I have found that many problems exist in the field of large couplings which do not occur in the design, manufacture and use of smaller couplings. For example, I have found that the tolerances in manufacture of large couplings make it much more difficult to seal the large couplings adequately. As an example, if a specified tolerance is set on the diameter of a large coupling, that tolerance can result in a much larger actual variation in size at the circumference of the large coupling than can occur with a smaller coupling. Accordingly, the tolerances of large couplings which must be permitted for proper manufacture, require that a particularly effective seal arrangement be utilized.

In addition to the problem of tolerances, large couplings in certain instances such as on basic oxygen furnaces also require swiveling ability and great weight carrying capacity which must be present in the coupling. In the coupling for which the present seal arrangement has been invented, the coupling must swivel to prevent hose kinking or breakage despite the heavy weight of the hoses, for example, 4,700 pounds on a 5 inch coupling.

In the coupling for which the present seal arrangement is provided, the large ball elements which keep the coupling in the assembled position also permit swiveling of the coupling elements even under high pressure which may be directed through the conduit. It is important to provide a seal which permits the swiveling of the coupling under pressure.

I have found, for many fluids at low temperatures, high pressures, and corrosive fluids, the tetrafluorenes, and particularly polytetrafluorethylene, sold commercially under the trade name "Teflon," is extremely suitable as a sealing material. Teflon, however, has an extremely low coefficient of elasticity which means that its restoration time can cause difficulties when used in certain sealing arrangements which are not properly designed to accommodate the characteristics of the Teflon.

The present invention is directed to providing a sealing arrangement for a fluid tight coupling, in which arrangement Teflon or other semirigid material can be utilized as a sealing material. Further, the sealing arrangement of the present invention provides for a high pressure seal in which no leakage occurs.

The sealing arrangement of the present invention permits sealing of the coupling under extremely high temperatures, extremely low temperatures, and also under high pressures or even under negative pressures. As an example of one use to which the coupling of the present invention may be put, and as an example of the rugged usage which the coupling of the present invention is required to meet, this coupling with the present sealing arrangement has been successfully utilized in providing oxygen to the oxygen lance for open-hearth furnaces. When used in the oxygen lance systems for open-hearth furnaces, the coupling is used to conduct liquid oxygen into the open-hearth furnace. When the liquid oxygen first passes through the coupling to the furnace, liquid oxygen makes the coupling extremely cold, the temperature of liquid oxygen being well below −300° Fahrenheit. When the oxygen contacts the flame within the furnace, the conduit to the oxygen lance immediately becomes very hot. The metal in the coupling often glows red in a matter of one minute after the oxygen reaches the furnace. Thus, the coupling of the present invention containing the present sealing arrangement goes from a temperature of well below −300° Fahrenheit to a temperature of over 400° Fahrenheit in a matter of less than a minute.

In the operation of one coupling in which the seal of the present invention is utilized, there is a need for the coupling, which is under pressure and supporting a load of 2½ tons, to swivel through 180° twice during every furnace heat. In one such installation where these couplings are being used, each coupling has swivelled approximately 4,300 times under the above conditions without one Teflon seal requiring replacement.

The sealing arrangement of the present invention is designed to provide a complete fluid tight seal under such adverse conditions of temperature variation. In addition to wide variations in temperature, there are also wide variations in pressure in the oxygen lance system. The oxygen is introduced into the furnace under high pressure. If a particular lance is bypassed, the common feed conduit for the lance causes a negative pressure or vacuum to be exerted on the seal of the particular lance which is being bypassed. Accordingly, the seal arrangement of the present invention must be designed to provide a fluid tight seal even under conditions of negative pressure in order to prevent the explosive oxygen from leaking into the environment surrounding the oxygen lance system.

I have found that the sealing arrangement of the present invention is required to solve problems not heretofore faced in the sealing of conduit couplings. Because of the large size of the couplings, the wide variations of temperature and pressure, and the extremely heavy use to which the couplings are put, I have found that a particularly effective sealing arrangement is required.

The sealing arrangement of the present invention, which solves the problems set forth above, is preferably formed with three sealing elements. The three sealing elements are separate and apart from each other and yet cooperate to prevent any leakage through the fluid coupling. The three sealing elements of the present invention are a seal ring having a V-shaped groove formed therein, and two O-rings which are strategically located relative to the V-shaped groove seal ring.

With the foregoing considerations in mind, it is an object of the present invention to provide an improved sealing arrangement for a fluid tight coupling.

Another object of the present invention is to provide a sealing arrangement which is particularly useful for a fluid tight coupling which conducts fluid at varying pressures and extreme temperature variations.

Another object of the present invention is to provide a three element sealing arrangement in which the elements are so located that no leakage can occur through the entire sealing arrangement.

Another object of the present invention is to provide a sealing arrangement for the coupling which does not interfere in any manner with the operation of the coupling.

Another object of the present invention is to provide a sealing arrangement for a coupling which seals under high positive pressures, as well as under negative pressures within the coupling.

Another object of the present invention is to provide a sealing arrangement which is effective for large diameter couplings as well as for small diameter couplings.

Another object of the present invention is to provide a sealing arrangement which is effective for a swivelling coupling.

Another object of the present invention is to provide a sealing arrangement which seals a coupling that must bear heavy weight hoses.

These and other objects of the present invention will become apparent as this description proceeds in conjunction with the accompanying drawing.

Figure 1:
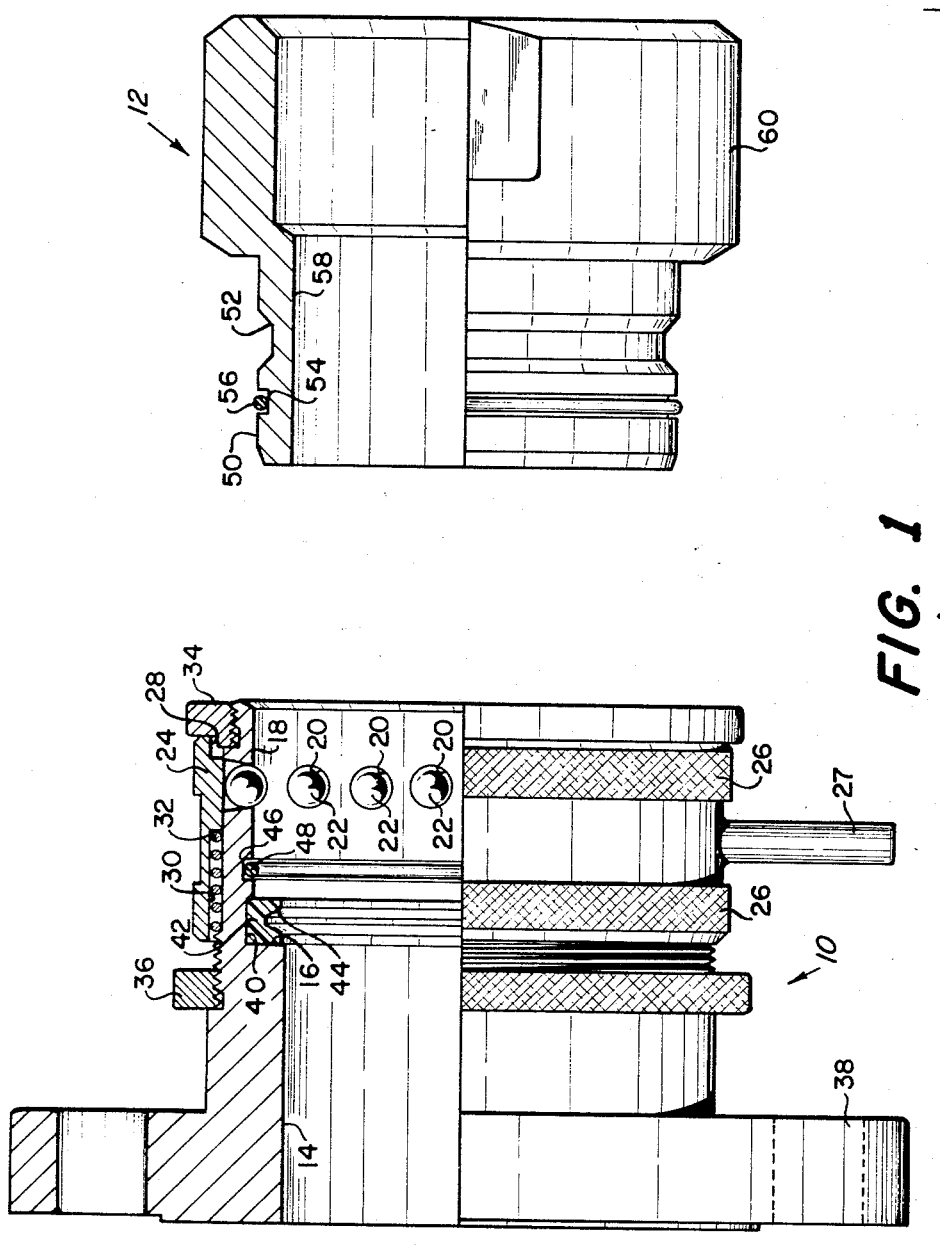
FIGURE 1 is an exploded view, in partial section, of a coupling containing the sealing arrangement of the present invention.

Referring to the drawings, and particularly to FIGURE 1, the coupling shown in a disassembled position in FIGURE 1 is formed from a housing 10 and a nipple 12 which is received within the housing.

The housing 10 has a fluid passage 14 formed therethrough. At the end of the fluid passage 14 is an annular wall 16 which opens the fluid passage 14 to connect with a cylindrical internal surface 18 formed in the end of the housing.

The cylindrical internal surface 18 has a plurality of holes 20 formed therein. The holes 20 are positioned at regular intervals around the periphery of internal surface 18 and are of such size that a series of locking balls 22 may be received, one in each hole 20. The locking balls 22 fit partially through the holes 20 so that they protrude into the cylindrical area defined by cylindrical internal surface 18. The locking balls 22 are of large enough diameter so that when they contact the nipple of the coupling, as will hereinafter be described, the nipple can swivel relative to the housing 10. The particular size of the locking balls 22, together with the groove of the nipple 12 permit this swivelling action to take place.

The locking balls 22 are retained within the respective holes 20 by a reciprocating sleeve 24 that overlays the external surface of housing 10. The reciprocating sleeve 24 has knurled outer surfaces 26 to facilitate gripping of the sleeve. In some instances, where very large couplings are involved, handles 27 are fixed to the sleeve 24 so that they may be gripped to facilitate reciprocation of sleeve 24. An end groove 28 is formed on the sleeve 24. When the sleeve 24 is reciprocated to the point where end groove 28 overlies the locking balls 22, the locking balls 22 may be forced radially outwardly so that they no longer protrude into the surface defined by cylindrical internal surface 18.

A spring recess 30 is formed on the underside of reciprocating sleeve 24 and a helical spring 32 is positioned within the spring recess between the sleeve 24 and the housing 10. The helical spring urges the reciprocating sleeve 24 to the position shown in FIGURES 1 and 2.

A retainer ring 34 is positioned on the housing to keep the sleeve 24 in position. The helical spring 32 urges reciprocating sleeve 24 against the retainer ring 34.

Figure 2:
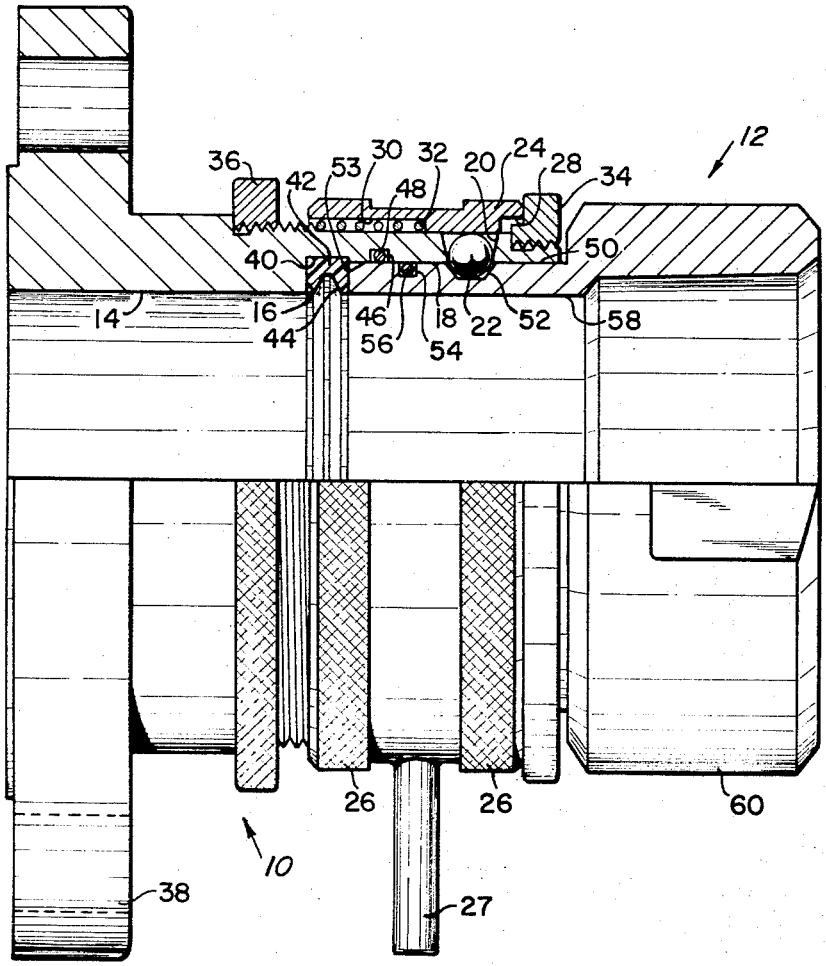
FIGURE 2 is a view, in partial section, of the coupling of FIGURE 1 in the assembled position.

A threaded lock ring 36 is provided around housing 10 and threaded lock ring 36 may be threaded to the right, as viewed in FIGURES 1 and 2, so that the sleeve 24 may be locked in the position shown in FIGURES 1 and 2 to thereby prevent the coupling from being disconnected when the coupling is in the assembled position shown in FIGURE 2.

The coupling housing 10 has a standard pipe flange 38 formed thereon so that the housing may be connected to any ordinary fluid conduit.

Formed in the cylindrical internal surface 18 of housing 10 is an annular groove 40 which is so positioned that annular wall 16, when continued radially outwardly, forms one wall of the annular groove 40. The annular groove 40 is thus in a position immediately next to the portion of the cylindrical housing where fluid passage 14 expands to form the cylindrical internal surface 18.

Positioned within annular groove 40 is a ring seal 42. The ring seal is generally square in cross section and has a V-shaped groove 44 formed therein. The V groove is in the cylindrical internal surface of the ring seal 42 so that the V groove 44 is exposed to line pressure of the fluid within the coupling as will hereinafter be more fully disclosed.

An annular groove 46 is formed within the cylindrical internal surface 18. Annular groove 46 sealingly receives an O-ring 48.

The nipple 12 of the coupling is best seen in FIGURE 1. Nipple 12 has a cylindrical external surface 50 in which is formed the retaining groove 52. The retaining groove is so positioned that when the nipple 12 is inserted into the housing 10, the retaining groove is aligned with the locking balls 22 so that the locking balls 22 extend radially inwardly into the groove 52 thereby keeping the nipple locked into the housing. The walls of the retaining groove 52 are each formed at an angle of 45° to the axis of the coupling to facilitate swivelling of the nipple within the housing 10.

The nipple 12 terminates in an annular end wall 53. The annular end wall bridges the distance between the cylindrical external surface 50 and the fluid passage 58 within the nipple 12.

Between the annular end wall 53 and the retaining groove 52 is formed an annular groove 54 in cylindrical external surface 50. Annular groove 54 receives an O-ring 56 in sealing relation thereto. The nipple 12 has a fitting portion 60 at one end thereof so that the nipple may be connected to the fluid conduit.

The sealing arrangement of the present invention consists of the ring seal 42 and the O-rings 48 and 56. The ring seal 42 is sealingly fitted into the housing 10 within annular groove 40. The O-ring 48 is also sealingly fitted within housing 10 within annular groove 46. The internal diameter of O-ring 48 is such that it is smaller than the diameter of cylindrical external surface 50 of nipple 12.

The nipple 12 carries the O-ring 56. O-ring is sealingly received within the annular groove 54. The outer diameter of O-ring 56 is such that the O-ring is larger than the diameter of cylindrical internal surface 18.

As best seen in FIGURE 2, when the coupling is assembled, the annular end wall 53 of nipple 12 comes into contact with the side of ring seal 42. The length of nipple 12 is such that when the nipple 12 is locked into the housing 10, an axial compressive force is exerted on the ring seal 42 between end wall 53 of nipple 12 and annular wall 16 of housing 10.

Because of the interference fits of the O-rings 48 and 56 with the cylindrical external surface 50 and the cylindrical internal surface 18, respectively, of the housing and nipple, a three element sealing arrangement is provided. Further, because of the O-rings 48 and 56, one of which seals at its internal surface and the other of which seals at its external surface, the variations in temperature cause expansion and contraction which always cause one of the O-rings to be in fluid tight engagement.

When the coupling is in the position shown in FIGURE 2, and the locking balls 22 extend into the groove 52 to retain the coupling in position, the V groove 44 of ring seal 42 is exposed to line pressure passing through the fluid coupling. This line pressure tends to separate the legs of the V so that the V groove ring seal 42 is more forceably forced into sealing engagement with the end wall 53 of nipple 12. When a vacuum, or negative pressure, is within the coupling line, the seal of the present invention also prevents reverse flow of air into the coupling.

I have found that the sealing elements 42, 48 and 56 of the present invention may be formed of polytetrafluorethylene, commonly known by its trade name "Teflon" and that when so formed, a fluid seal is provided through which there is no leakage at internal pressures as high as 381 pounds per square inch in a 5 inch inch ID coupling, as well as no leakage of air into the coupling at negative pressures. I have further found that if only the ring seal 42 is utilized, leakage occurs at negative pressures. In addition, if only one or both of the O-rings 48 and 56 are utilized, leakage occurs at high internal pressures.

The sealing arrangement of the present invention is particularly effective with the large variations in temperature to which the seal is subjected. When the seal is at a very cold temperature, the O-rings 48 and 56 tend to contract. This causes the O-ring 48 to effectively seal against the surface 50 of nipple 12. When extreme heat is applied to the coupling, the O-rings 48 and 56 expand so that O-ring 56 seals effectively against the cylindrical internal surface of housing 10. Thus, the two O-rings, 48 and 56, operate in conjunction with each other to always provide a seal even though there is expansion and contraction of the sealing elements as well as the metal coupling elements.

I believe that the effectiveness of the present seal with low coefficient of elasticity material such as Teflon is also due to the fact that the large ring seal 42 prevents any substantial volume of fluid from reaching the sealing O-rings 48 and 56. Although there may be some leakage past the seal ring 42, the volume of that leakage is so small that it can be managed and kept from leaking further by O-rings 48 and 56. The combination of elements thus provided keeps any leakage from occurring at the high pressures indicated, as well as at negative pressures and throughout varying temperatures.

In addition to the foregoing, it will be appreciated that the ring seal 42 and the O-rings 48 and 56 can be formed from more resilient material such as rubber, buna N, or the like and provide an equally effective seal. The Teflon, of course, is more resistant to certain chemical processes and withstands the temperature variations much better than those materials and is, for those reasons, often required.

The sealing arrangement of the present invention permits the coupling to swivel in operation, is effective with large couplings having a diameter of two inches or greater, as well as smaller couplings, and also provides a sealing arrangement which can be utilized under all difficult and adverse conditions which are present when an oxygen lance is provided for open-hearth furnaces.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a fluid tight coupling comprising a housing having a cylindrical interal surface adapted to receive a nipple having a cylindrical external surface terminating in an annular end wall, said housing and said nipple cylindrical surfaces being contiguous when said coupling is in the assembled position, and means associated with said housing and said nipple to releasably secure said nipple within said housing at a predetermined axial position, the improvement comprising:

(a) a first O-ring of circular cross section sealingly retained on said nipple cylindrical external surface and having an outer diameter greater than the diamter of said housing cylindrical internal surface whereby a fluid seal is formed between said first O-ring and said housing when said nipple is releasably secured within said housing;

(b) a second O-ring of circular cross section sealingly retained within said housing cylindrical internal surface and having an inner diameter smaller than the diameter of said nipple cylindrical external surface whereby a fluid seal is formed between said second O-ring and said nipple when said nipple is releasably secured within said housing; and (c) a ring seal of generally square cross section having a V-shaped groove formed in the cylindrical internal surface of said ring seal, said ring seal being sealingly retained within said housing and being so located that said nipple annular end wall sealingly abuts said ring seal when said nipple is releasably secured within said housing, said V-shaped groove in said ring seal being exposed to the line pressure of fluid passing through said coupling;

(d) said first and second O-rings being located in a position to stop fluid which may leak past said ring seal, and said first and second O-rings cooperating under a wide range of temperature conditions to maintain a seal between said nipple and said housing whereby when the coupling is subjected to extreme heat said first O-ring expands and maintains a fluid tight seal against said cylindrical internal surface of the housing and when the coupling is subjected to extreme cold temperatures said second O-ring contracts and maintains a fluid tight seal against said cylindrical external surface of the nipple.

2. The improvement of claim 1 wherein said first O-ring, said second O-ring and said ring seal are each formed from material having a low coefficient of elasticity.

3. The improvement of claim 1 wherein said first O-ring, said second O-ring and said ring seal are each formed from polyflurotetraethylene.

4. In a fluid tight coupling comprising a housing having a cylindrical internal surface adapted to receive a nipple having a cylindrical external surface terminating in an annular end wall, said housing and said nipple cylindrical surfaces being contiguous when said coupling is in the assembled position, and means associated with said housing and said nipple to releasably secure said nipple within said housing at a predetermined axial position, the improvement comprising:

(a) a first annular groove formed in said nipple cylindrical external surface;

(b) a first O-ring of circular cross section sealingly retained on said nipple within said first annular groove, said first O-ring having an outer diameter greater than the diameter of said housing cylindrical internal surface whereby a fluid seal is formed between said first O-ring and said housing when said nipple is releasably secured within said housing;

(c) a second annular groove formed in said housing cylindrical internal surface;

(d) a second O-ring of circular cross section sealingly retained within said housing within said second annular groove, said second O-ring having an inner diameter smaller than the diameter of said nipple cylindrical external surface whereby a fluid seal is formed between said second O-ring and said nipple when said nipple is releasably secured within said housing;

(e) a third annular groove formed in said housing cylindrical internal surface at the point where said housing cylindrical internal surface meets the housing wall forming the fluid passage through said housing;

(f) a ring seal of generally square cross section having a V-shaped groove formed in the cylindrical internal surface of said ring seal, said ring seal being sealingly retained within said housing and within said third annular groove, one end wall of said ring seal abutting said housing wall and the other end wall of said ring seal being sealingly contacted by said nipple annular end wall when said nipple is releasably secured within said housing, said V-shaped groove in said ring seal being exposed to the line pressure of fluid passing through said coupling;

(g) said first and second O-rings being located in a position to stop fluid which may leak past said ring seal, and said first and second O-rings cooperating under a wide range of temperature conditions to maintain a seal between said nipple and said housing whereby when the coupling is subjected to extreme heat said first O-ring expands and maintains a fluid tight seal against said cylindrical internal surface of the housing and when the coupling is subjected to extreme cold temperatures said second O-ring contracts and maintains a fluid tight seal against said cylindrical external surface of the nipple.

5. The improvement of claim 4 wherein an axial compressive force is exerted upon said ring seal between said housing and said nipple end wall when said nipple is releasably secured within said housing.

6. A fluid tight coupling comprising:

(a) a housing having a cylindrical internal surface, a plurality of locking balls reciprocable to protrude through a plurality of holes formed in said housing cylindrical internal surface, and means to retain said locking balls radially inwardly in order to provide a locking arrangement for said housing;

(b) a nipple having a cylindrical external surface terminating in an annular end wall, said housing and said nipple cylindrical surfaces being contiguous when said coupling is in the assembled position, a retaining groove formed in said nipple cylindrical external surface to receive said locking balls when said coupling is in the assembled position;

(c) a first O-ring of circular cross section sealingly retained on said nipple cylindrical external surface and having an outer diameter greater than the diameter of said housing cylindrical internal surface whereby a fluid seal is formed between said first O-ring and said housing when said nipple is releasably secured within said housing;

(d) a second O-ring of circular cross section sealingly retained within said housing cylindrical internal surface and having an inner diameter smaller than the diameter of said nipple cylindrical external surface whereby a fluid seal is formed between said second O-ring and said nipple and when said nipple is releasably secured within said housing; and (e) a ring seal of generally square cross section having a V-shaped groove formed in the cylindrical internal surface of said ring seal, said ring seal being sealingly retained within said housing and being so located that said nipple annular end wall sealingly abuts said ring seal when said nipple is releasably secured within said housing, said V-shaped groove in said ring seal being exposed to the line pressure of fluid passing through said coupling;

(f) said first and second O-rings being located in a position to stop fluid which may leak past said ring seal, and said first and second O-rings cooperating under a wide range of temperature conditions to maintain a seal between said nipple and said housing whereby when the coupling is subjected to extreme heat said first O-ring expands and maintains a fluid tight seal against said cylindrical internal surface of the housing and when the coupling is subjected to extreme cold temperatures said second O-ring contracts and maintains a fluid tight seal against said cylindrical external surface of the nipple.

7. The fluid tight coupling of claim 6 wherein said retaining groove walls are formed at an angle of 45° to said coupling axis.

8. The fluid tight coupling of claim 6 wherein the passageway of said fluid tight coupling is greater than two inches in diameter.

References Cited

UNITED STATES PATENTS

| | | | |
|---|---|---|---|
| 2,689,143 | 9/1954 | Scheiwer | 285—277 |
| 2,750,209 | 6/1956 | Robb | 285—277 X |
| 3,229,996 | 1/1966 | Cadwell | 285—277 X |

FOREIGN PATENTS

| | | |
|---|---|---|
| 1,071,423 | 12/1959 | Germany. |
| 960,916 | 6/1964 | Great Britain. |
| 410,903 | 6/1945 | Italy. |

CARL W. TOMLIN, *Primary Examiner.*

THOMAS F. CALLAGHAN, *Examiner.*